United States Patent
Hahn

(10) Patent No.: US 10,837,568 B2
(45) Date of Patent: Nov. 17, 2020

(54) VALVE CONTROL SYSTEM AND METHOD

(71) Applicant: Acorn Engineering Company, City of Industry, CA (US)

(72) Inventor: Ronald T. Hahn, Yorba Linda, CA (US)

(73) Assignee: Acorn Engineering Company, City of Industry, CA (US)

( * ) Notice: Subject to any disclaimer, the term of this patent is extended or adjusted under 35 U.S.C. 154(b) by 307 days.

(21) Appl. No.: 15/359,671

(22) Filed: Nov. 23, 2016

(65) Prior Publication Data
US 2018/0143652 A1    May 24, 2018

(51) Int. Cl.
| F16K 11/00 | (2006.01) |
| E03B 7/07 | (2006.01) |
| F16K 37/00 | (2006.01) |
| E03B 7/08 | (2006.01) |

(52) U.S. Cl.
CPC ............ *F16K 19/006* (2013.01); *E03B 7/071* (2013.01); *E03B 7/08* (2013.01); *F16K 37/0075* (2013.01)

(58) Field of Classification Search
CPC ..... Y10T 137/86453; Y10T 137/86389; Y10T 137/86445; F16K 31/00
USPC ....................................... 137/624.11, 624.18
See application file for complete search history.

(56) References Cited

U.S. PATENT DOCUMENTS

| | | | | |
|---|---|---|---|---|
| 4,513,808 A * | 4/1985 | Ito | ...................... | B60H 1/00842 165/103 |
| 5,174,335 A * | 12/1992 | Iwabuchi | ........... | G05D 16/2093 137/624.18 |
| 5,287,884 A * | 2/1994 | Cohen | ..................... | E03B 7/071 137/486 |
| 5,309,942 A * | 5/1994 | Orii | ......................... | F16K 31/48 137/624.11 |
| 6,089,269 A * | 7/2000 | Essam | ................. | F16K 31/1221 137/624.13 |
| 6,129,103 A * | 10/2000 | Fields | ..................... | F16K 31/48 137/1 |
| 6,920,409 B2 * | 7/2005 | Essam | ................. | F16K 37/0091 702/114 |
| 7,721,359 B2 | 5/2010 | Tsutsui et al. | | |
| 7,931,447 B2 | 4/2011 | Levin et al. | | |
| 9,217,108 B2 | 12/2015 | Wallace | | |
| 2012/0090702 A1 * | 4/2012 | Shalev | ..................... | G01F 1/66 137/486 |

FOREIGN PATENT DOCUMENTS

GB       2525017 A      4/2013

* cited by examiner

*Primary Examiner* — Angelisa L. Hicks
(74) *Attorney, Agent, or Firm* — Eric J. Sosenko; Jonathan P. O'Brien; Honigman LLP

(57) ABSTRACT

A fluid control system includes a valve, an actuator, a primary valve timing system, and a secondary valve timing system. The valve is operable in an open position and a closed position. The actuator is operable to move the valve from the closed position to the open position. The primary valve timing system is in communication with the actuator and is operable to move the valve from the open position to the closed position after a first period of time. The secondary valve timing system is in communication with the actuator and is operable to move the valve from the open position to the closed position after a second period of time.

11 Claims, 2 Drawing Sheets

VALVE CONTROL SYSTEM AND METHOD

FIELD

The present disclosure relates generally to a valve control system and method, and more particularly to system and method for controlling a valve in a power failure event.

BACKGROUND

This section provides background information related to the present disclosure and is not necessarily prior art.

Systems for controlling fluid flow often include valves and mechanisms for opening and closing the valves to control the flow of fluid therethrough. For example, residential and commercial plumbing systems often include valves and user interfaces, such as handles, for opening and closing the valves to control the flow of water therethrough. Some valves include an opening control mechanism (e.g., a handle or button) for opening the valve, and a closing control mechanism (e.g., a motor, a solenoid, a pump, etc.) for closing the valve. In some systems, the closing control mechanism may be operated to automatically close the valve upon the occurrence of a predetermined event and/or after a predetermined period of time. Such systems may include a backup control mechanism for closing the valve in the event the closing control mechanism fails to close the valve. While known valves and valve control systems have proven useful for their intended purposes, a continuous need for improvement in the relevant art remains.

SUMMARY

This section provides a general summary of the disclosure, and is not a comprehensive disclosure of its full scope or all of its features.

One aspect of the disclosure provides a fluid control system. The fluid control system may include a valve, an actuator, a primary valve timing system, and a secondary valve timing system. The valve may be operable in an open position and a closed position. The actuator may be operable to move the valve from the closed position to the open position. The primary valve timing system may be in communication with the actuator and may be operable to move the valve from the open position to the closed position after a first period of time. The secondary valve timing system may be in communication with the actuator and may be operable to move the valve from the open position to the closed position after a second period of time.

Implementations of the disclosure may include one or more of the following optional features.

In some implementations, the second period of time is greater than the first period of time.

In some implementations, the actuator includes a pump in fluid communication with the valve, the primary valve timing system, and the secondary valve timing system.

In some implementations, the primary valve timing system is operable to fluidly communicate with the valve. The secondary valve timing system may be operable to fluidly communicate with the valve.

In some implementations, the primary valve timing system includes a primary vent valve and a switch in communication with the primary vent valve. The actuator may be operable to move the switch from an open position to a closed position. The primary valve timing system may include a timing control module operable to determine the first period of time.

In some implementations, secondary valve timing system includes a secondary vent valve in fluid communication with the valve and a surrounding environment. The secondary vent valve may be operable to communicate fluid from the environment to the valve such that the valve moves from the open position to the closed position.

Another aspect of the disclosure provides a fluid control system. The fluid control system may include a valve, a primary vent valve, and a secondary vent valve. The valve may be operable in an open position and a closed position. The primary vent valve may be operable to control a flow of fluid from an environment to the valve. The secondary vent valve may be in fluid communication with the primary vent valve. The secondary vent valve may operable to control a flow of fluid from the environment to the valve.

This aspect may include one or more of the following optional features. In some implementations, the fluid control system may include a timing control module configured to allow the primary vent valve to communicate with the valve after a first period of time. The secondary vent valve may be operable to fluidly communicate with the valve during the first period of time.

The secondary vent valve may be operable to move the valve to the closed position after a second period of time. In some implementations, the second period of time is longer than the first period of time.

According to yet another aspect, the present disclosure provides a method of operating a fluid control system. The method may include opening a valve. The method may also include attempting to close the valve with a primary valve timing system after a first period of time. The method may further include attempting to close the valve with a secondary valve timing system after a second period of time that is greater than the first period of time.

In some implementations, attempting to close the valve with a secondary valve timing system occurs automatically. Attempting to close the valve with a secondary valve timing system may include automatically venting the valve to atmospheric pressure.

In some implementations, the primary valve timing system and the secondary valve timing system are operable to communicate fluid from the environment to the valve such that the valve moves from the open position to the closed position.

In some implementations, the method includes failing to close the valve with the primary valve timing system after the first period of time.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
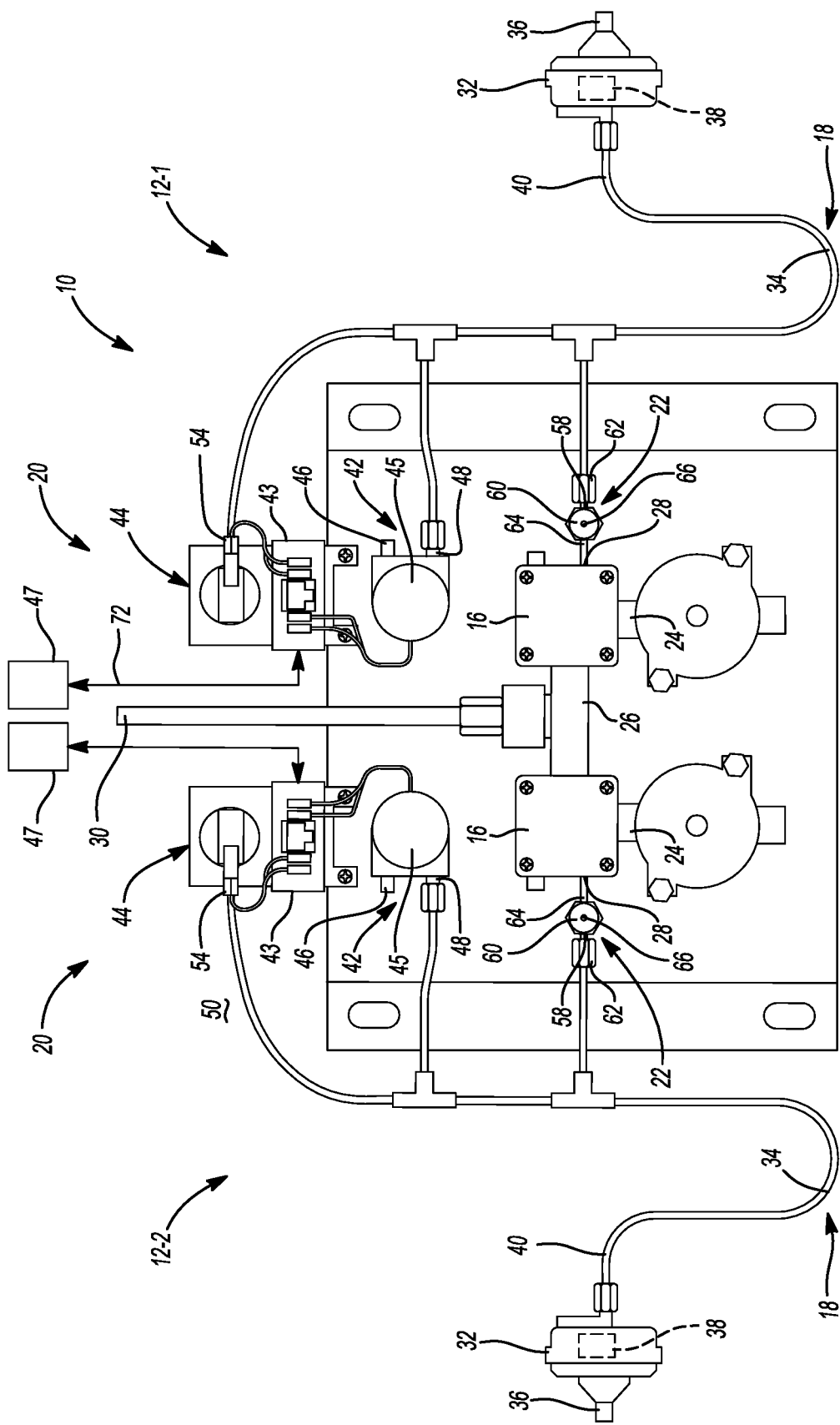
FIG. 1 is a functional block diagram of a valve control system according to the principles of the present disclosure.

With reference to FIG. 1, a fluid control system 10 is shown. In some implementations, the fluid control system 10 may control the flow of a liquid, such as water, for example. It will be appreciated, however, that the system 10 may be utilized to control the flow of other fluids within the scope of the present disclosure.

The fluid control system 10 may include one or more valve systems 12-1, 12-2, . . . 12-n. In some implementations, the fluid control system 10 may include two valve systems 12-1, 12-2. In this regard, the first valve system 12-1 may control the flow of cold water from a first water source (not shown) such as a well or a municipal water source, for example, to a use location (not shown) such as a sink or shower, for example, and the second valve system 12-2 may control the flow of hot water from a second water source (not shown) such as a hot water tank, for example, to the use location. It will be appreciated, however that the fluid control system 10 may include more or less than the two valve systems 12-1, 12-2 within the scope of the present disclosure.

Each valve system 12-n may include a valve 16, a valve actuation system 18, a primary valve timing system 20, and a secondary valve timing system 22. The valve 16 may include an inlet 24, an outlet 26, and a valve control feature such as a port 28. The inlet 24 may be in fluid communication with a water source (e.g., one of the first water source and the second water source). The outlet 26 may be downstream of the inlet 24 and in fluid communication with an outlet conduit 30 and/or the use location.

The valve 16 may operate in and/or between open and closed positions. In this regard, the valve 16 may include a pneumatically-actuated valve, for example, that is operable in and/or between open and closed positions to control the flow of fluid from the inlet 24 through the outlet 26. The valve control feature, such as the port 28, may be in communication with the valve 16 to control the position (e.g., open and closed) thereof. For example, in some implementations the port 28 may be in fluid communication with the valve 16 such that a flow of fluid through the port 28 controls (i) the position (e.g., open and closed) of valve 16 and, therefore, (ii) the flow of fluid from the inlet 24 through the outlet 26. In this regard, in some implementations, the valve 16 includes a pneumatically-actuated valve, opened and/or closed by delivering fluid (e.g., air) to and/or removing fluid (e.g., air) from the valve 16 through the port 28.

The valve actuation system 18 may include an actuator 32 and a communication member 34. The valve actuation system 18 may be in communication with the primary valve timing system 20 and with the secondary valve timing system 22 through the communication member 34. The actuator 32 may include a user interface 36 (e.g., a button, a switch, a knob, etc.) that allows a user to initiate communication between the actuator 32 and the primary and secondary valve timing systems 20, 22 via the communication member 34. In this regard, in some implementations, the actuator 32 includes a pump 38 and the communication member 34 includes a conduit 40 (e.g., a tube), such that the pump 38 is in fluid communication with the primary valve timing system 20 and the secondary valve timing system 22 via the conduit 34.

The primary valve timing system 20 may include a primary vent valve 42, a primary timing switch 44, an interconnection module 43, and a primary valve timing control module 47. The primary timing switch 44 may be in electrical communication with the primary vent valve 42 and in fluid communication with the valve actuation system 18. In this regard, in some implementations, the primary vent valve 42 includes a primary vent valve control member 45, an inlet port 46, and an outlet port 48. The vent valve control member 45 can control the flow of fluid from the inlet port 46 and through the outlet port 48. For example, the primary vent valve 42 and/or the vent valve control member 45 may be operable in and between an open position and a closed position to control the flow of fluid through the outlet port 48 from the inlet port 46. In some implementations, the vent valve control member 45 includes a solenoid 45 in electrical communication with the primary timing switch 44 and operable in and between the open position and the closed position. In this regard, when the solenoid 45 is in the open position, the solenoid 45 may allow fluid communication between the inlet port 46 and the outlet port 48. When the solenoid 45 is in the closed position, the solenoid 45 may prevent fluid communication between the inlet port 46 and the outlet port 48.

As will be explained in more detail, below, the primary valve timing control module 47 may determine a length of time during which the valve 16 is in a predetermined position (e.g., open).

The inlet port 46 may be in fluid communication with a first fluid source 50 at a first pressure P1. In some implementations, the first fluid source 50 may include the environment (e.g., air) surrounding the fluid control system 10. In this regard, the first pressure P1 may be generally equal to atmospheric pressure. The outlet port 48 may be in fluid communication with a second fluid source at a second pressure P2. In some implementations, the second fluid source may include the conduit 40. Accordingly, as will be explained in more detail below, when the second pressure P2 is less than the first pressure P1, a flow of fluid is generally from the first fluid source 50 to the conduit 40 when the primary vent valve 42 and/or the solenoid 45 is in the open position. For example, the flow of fluid may be from the environment to the conduit 40, through the vent valve 42, when the solenoid 45 is in the open position.

The primary timing switch 44 may be operable in an open position and a closed position. In some implementations, the primary timing switch 44 is pneumatically-controlled between the open and closed positions. For example, the primary timing switch 44 may include a vacuum switch operable in the open position in response to a first fluid pressure (e.g., P1) and the closed position in response a second fluid pressure (e.g., P2). In this regard, the primary timing switch 44 may include a port 54 in fluid communication with the conduit 40. As will be explained in more detail below, in some implementations (e.g., when the primary vent valve 42 is in the open position), the port 54 may receive fluid at the first pressure P1 from the conduit 40 via the primary and/or secondary valve timing systems 20, 22. In other implementations (e.g., when the primary vent valve 42 is in the closed position), the port 54 may receive fluid at the second pressure P2 from the conduit 40 via the actuator 32.

Figure 2:
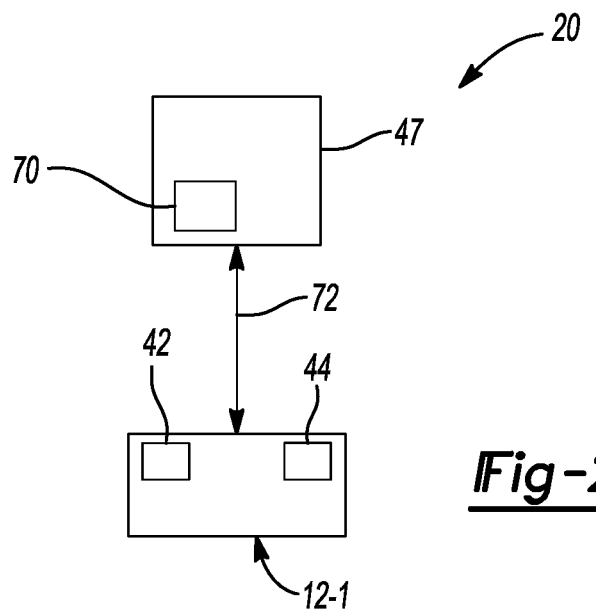
FIG. 2 is another functional block diagram of a valve control system according to the principles of the present disclosure.

With reference to FIG. 2, the primary valve timing control module 47 may include a monitoring module 70 and a link 72 and may be implemented in a number of different forms. For example, the primary valve timing control module 47 may be implemented as, and/or otherwise include, a programmed electronic controller, such as the MASTER-TROL WATER MANAGEMENT SYSTEM controller, manufactured by Acorn Engineering Company, for example.

The primary valve timing control module 47 may be in communication with the primary vent valve 42 and the primary timing switch 44 to control the flow of fluid through the valve actuation system 18 (e.g., through the inlet port 46 and the outlet port 48). In this regard, as will be explained in more detail below, the primary valve timing control module 47 may communicate with the primary timing switch 44 in order to move the primary timing switch 44 from and between open and closed positions. The primary timing switch 44 may communicate with the primary vent valve 42 (e.g., the solenoid 45) in order to move the solenoid 45 from and between open and closed positions, thereby controlling the flow of fluid through the valve actuation system 18 (e.g., through the inlet port 46 and the outlet port 48).

The secondary valve timing system 22 may include a timer such as a secondary vent valve 58, for example, having a secondary vent valve control member 60, an inlet port 62, an outlet port 64, and a relief port 66. The inlet port 62 may be coupled to, and/or otherwise in fluid communication with, the conduit 40. The outlet port 64 may be coupled to, and/or otherwise in fluid communication with, the valve control (e.g., port 28) of the valve 16. The relief port 66 may be in fluid communication with the inlet port 62 and the outlet port 64 via the secondary vent valve control member 60. In this regard, as will be explained in more detail below, the secondary valve timing system 22, including the secondary vent valve control member 60, may control the rate of fluid flow through the relief port 66 from the first fluid source 50. For example, the secondary vent valve control member 60 may be operable in and between an open position and a closed position to control the rate of fluid flow through the outlet port 64 from the relief port 66. In some implementations, the secondary vent valve control member 60 is adjustably (e.g., threadably) engaged with a portion of the secondary vent valve 58. Accordingly, moving the secondary vent valve control member 60 in a first direction (e.g., clockwise) may urge the secondary vent valve control member 60 from the open position to the closed position to reduce the flow rate of fluid from the first fluid source 50 through the relief port 66 and, thereafter, through the outlet port 64, which increases the timing of the valve 16. Conversely, moving the secondary vent valve control member 60 in a second direction (e.g., counterclockwise), opposite the first direction, may urge the secondary vent valve control member 60 from the closed position to the open position to increase the flow rate of fluid from the first fluid source 50 through the relief port 66 and, thereafter, through the outlet port 64, which decreases the timing of the valve 16.

As will be explained in more detail below, the primary valve timing control module 47 may communicate through the link 72 with the valve systems 12-1, 12-2, . . . 12-n. In this regard, the link 72 may include a communication link between the primary valve timing control module 47 and the valve systems 12-1, 12-2, . . . 12-n. In some implementations, the monitoring module 70 may communicate with each valve system 12-n through the link 72 to monitor and detect changes in the status (e.g., open and closed) of the primary timing switch 44.

Figure 3:
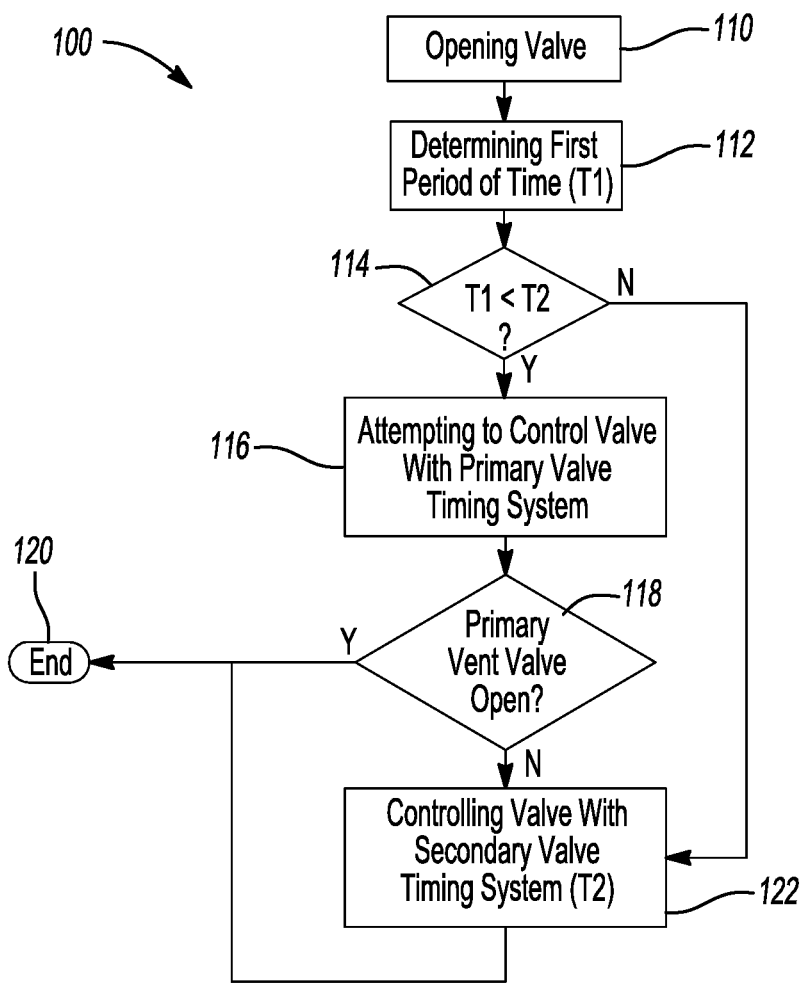
FIG. 3 is a flowchart depicting an example method of controlling a valve system according to the principles of the present disclosure.

With reference to FIG. 3, a method 100 of operating the fluid control system 10 will now be described. At step 110, the method 100 may include opening the valve 16. In this regard, at 110, the method 100 may include using the actuator 32 to open the valve 16. For example, a user may interact with the interface 36 to activate the pump 38 and create a vacuum within the conduit 40, such that the pressure within the conduit is reduced to the pressure P2. The vacuum within the conduit 40 may cause fluid to flow (i) through the outlet port 48 of the primary vent valve 42, (ii) through the port 54 of the primary timing switch 44, and/or (iii) through the outlet port 64 of the valve 16. In this regard, the flow of fluid through the port 54 of the primary timing switch 44 may cause the primary timing switch 44 to move from an opened position to a closed position, while the flow of fluid through the outlet port 64 of the valve 16 may simultaneously cause the valve 16 to move from a closed position to an open position. Accordingly, the vacuum within the conduit 40 may cause fluid to flow from one of the first and second fluid sources, through the inlet 24 of the valve 16, and through the outlet conduit 30 to the use location.

At step 112, the method 100 may include determining a first period of time T1 during which the valve 16 is in the open position. In this regard, upon closing the primary timing switch 44 at 110, the method 100 may include activating the primary valve timing control module 47 to determine the first period of time T1 at step 112. In some implementations, the monitoring module 70 may detect the closure of the primary timing switch 44 at 110 and thereafter communicate with the primary valve timing control module 47 via the link 72 to determine the first period of time T1 at step 112.

At step 114, the method 100 may include determining whether the first period of time T1 is less than a second period of time T2. If the first period of time T1 is greater than the second period of time T2 (i.e., if step 114 is false), or if the first period of time T1 is equal to zero, the valve timing will default to the secondary valve system 22 and the method 100 may proceed to 122. If the first period of time T1 is less than the second period of time T2 (i.e., if step 114 is true), the method may proceed to step 116.

At step 116, the method 100 may include attempting to control the position of the valve 16 with the primary valve timing system 20 (e.g., with the primary valve timing control module 47). For example, at 116, the method 100 may include attempting to open the primary vent valve 42. In this regard, at 116, the method may include attempting to allow fluid communication from the fluid source 50 (i) to the conduit 40 through the inlet port 46 of the primary vent valve 42, and, thereafter, (ii) to the valve 16 through the port 28. In this regard, at 116, the method may include attempting to actuate the solenoid 45 to allow fluid communication from the fluid source 50 to the primary vent valve 42 and to the valve 16. Allowing fluid communication from the fluid source 50 to the primary vent valve 42 and to the valve 16 may increase the pressure within the conduit 40 to the pressure P1.

At step 118, the method 100 may include determining whether the primary vent valve 42 is open. If 118 is true, the method 100 may proceed to 120. If 118 is false, the method may proceed to 122.

At step 122, the method 100 may include controlling the position of the valve 16 with the secondary valve timing system 22. For example, at 122, the method may include automatically controlling the position of the valve 16 with the secondary valve timing system 22. In particular, at 122, the method 100 may include allowing the valve 16 to fluidly communicate with the fluid source 50 through the relief port 66 of the secondary vent valve 58. In this regard, the flow rate of fluid through the relief port 66 may be such that the secondary vent valve 58 closes the valve 16 after the second period of time T2. The second period of time T2 may be greater than the first period of time T1. In some implementations, the second period of time T2 is between five seconds and ten seconds longer than the first period of time T1.

The configuration of the valve control system 10 and the corresponding method of operation can help to ensure proper operation of the valve 16 to both start and terminate the flow of fluid from inlet 24 to the outlet 26, and to the outlet conduit 30, in various scenarios. For example, in a scenario in which the primary valve timing system 20 fails to properly operate (e.g., the primary valve timing control module 47 malfunctions, the primary timing switch 44 malfunctions, the primary vent valve 42 malfunctions, there is a lack of power to the primary valve timing control module 47 and/or to the primary valve timing system 20, etc.), the secondary valve timing system 22, including the secondary vent valve 58, can cause the valve 16 to move from the opened position to the closed position in order to terminate the flow of fluid from inlet 24 to the outlet 26, and to the outlet conduit 30. In particular, if the primary valve timing system 20 malfunctions, the valve control system 10 will automatically default to the secondary timing system 22.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items, and the term "communicate" may include various types of communication, including electrical communication (e.g., wired or wireless communication) and fluid communication.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

What is claimed is:

1. A fluid control system comprising:
   a valve moveable between an open position and a closed position;
   an actuator fluidly coupled to the valve;
   an electronic primary valve timing system in communication with the actuator and the valve, the primary valve timing system configured to initiate movement of the valve from the open position to the closed position during a first period of time, the primary valve timing system including a primary vent valve having a port in fluid communication with an environment surrounding the system and being configured to control a flow of fluid from the environment through the primary vent valve and to the valve;
   a secondary valve timing system in fluid communication with the actuator and the valve, the secondary valve timing system including a secondary vent valve in fluid communication with the primary vent valve and including a port in automatic metered fluid communication with the environment surrounding the system independently from the primary vent valve, the secondary vent valve being configured to control a flow of fluid from the environment through the secondary vent valve and to the valve simultaneously with and independently of the primary vent valve; and
   an electronic timing control module configured to allow the primary vent valve to fluidly communicate the environment with the valve to initiate closing of the valve during a first period of time, the secondary vent valve being configured to meter fluid communication of the environment with the valve during the first period of time and to effectuate movement of the valve to the closed position after the first period of time when the valve fails to achieve the closed position by the primary valve timing system.

2. The fluid control system of claim 1, wherein the actuator includes a pump in fluid communication with the valve, the primary valve timing system, and the secondary valve timing system.

3. The fluid control system of claim 1, wherein the timing control module includes a timing switch and the actuator is in fluid communication with the timing switch and configured to move the timing switch from an open position to a closed position via fluid communication.

4. The fluid control system of claim 3, wherein the timing control module is configured to determine the first period of time.

5. The fluid control system of claim 1, wherein the secondary vent valve is configured to communicate fluid from the ambient environment to the valve whereby the valve moves from the open position to the closed position.

6. The fluid control system of claim 1, further comprising an actuator coupled to the valve.

7. The fluid control system of claim 6, wherein the actuator includes a vacuum pressure source.

8. A method of operating a fluid control system, the method comprising:
opening a valve from a closed position to an open position;
during a first period of time, initiating closing of the valve from the open position with an electronic primary valve timing system; and
during the first period of time, simultaneously operating a secondary valve timing system independent of the primary valve timing system wherein upon the valve failing to close after initiating closing of the valve with the primary valve timing system and after the first period of time has concluded the secondary valve timing system causes closing of the valve from the open position to the closed position by metering fluid communication of the valve with an ambient environment surrounding the system.

9. The method of claim 8, wherein the step of initiating closing of the valve with the secondary valve timing system occurs after the first period of time.

10. The method of claim 8, wherein the primary valve timing system and the secondary valve timing system openly communicate fluid from the ambient environment surrounding the system to the valve such that the valve moves from the open position to the closed position.

11. The method of claim 8, wherein the valve is opened by an actuator establishing vacuum pressure in communication with the valve.

* * * * *